United States Patent
Smith et al.

[15] 3,685,545
[45] Aug. 22, 1972

[54] PIPE REPAIR SYSTEM

[72] Inventors: Joseph B. Smith, Berea; Ronald D. Gardner, Brunswick, both of Ohio

[73] Assignee: The Pipe Line Development Co., Cleveland, Ohio

[22] Filed: June 3, 1970

[21] Appl. No.: 43,027

[52] U.S. Cl. .....................138/99, 285/328, 285/373
[51] Int. Cl. ...............................................F16z 55/16
[58] Field of Search.....................61/72.1, 72.3, 72.4; 138/97–99, 94; 166/0.5, 0.6; 285/15, 328, 373; 269/46, 296

[56] References Cited

UNITED STATES PATENTS

| | | | |
|---|---|---|---|
| 2,780,244 | 2/1957 | Lee | 138/94 |
| 2,236,913 | 4/1941 | Merrill | 138/99 |
| 3,078,108 | 2/1963 | Smith | 285/373 X |
| 1,905,324 | 4/1933 | Waters | 285/373 X |
| 3,252,192 | 5/1966 | Smith | 138/99 X |

*Primary Examiner*—Edward J. Earls
*Attorney*—McNenny, Farrington, Pearne and Gordon

[57] ABSTRACT

A fixture and a method for underwater installation of a device, such as a repair coupling, on a pipe are provided. The fixture includes a frame assembly having mounting means adapted to retain the device in a retracted position clear of the pipe and guide means to engage the pipe and maintain the frame in a predetermined position with respect to the pipe. The mounting means is operable to move the repair coupling to an installation position against the pipe while the guide means maintains the frame assembly in a stationary position on the pipe. With this invention the manual handling of the repair coupling is virtually eliminated and the time required for installation is greatly reduced.

19 Claims, 7 Drawing Figures

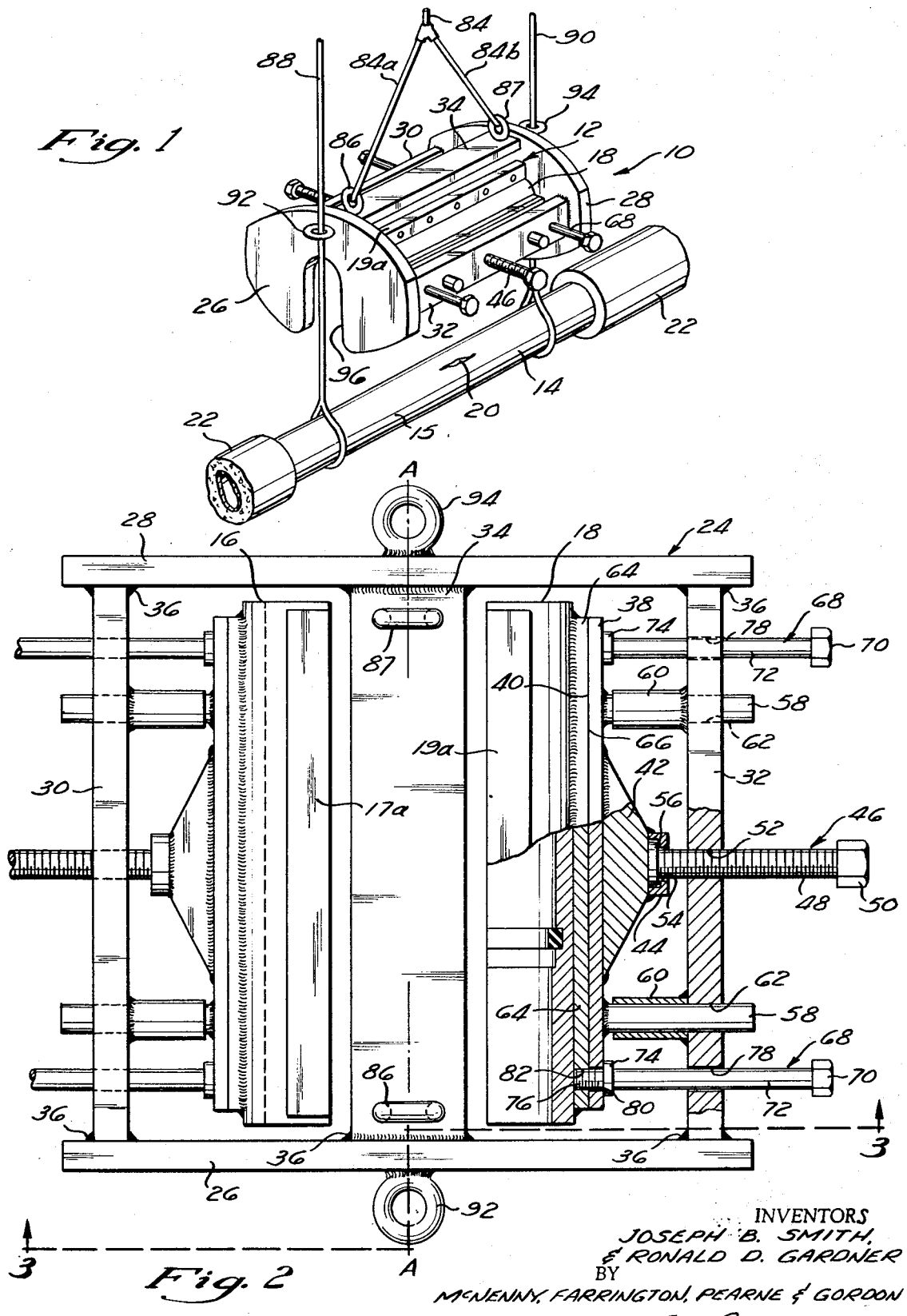

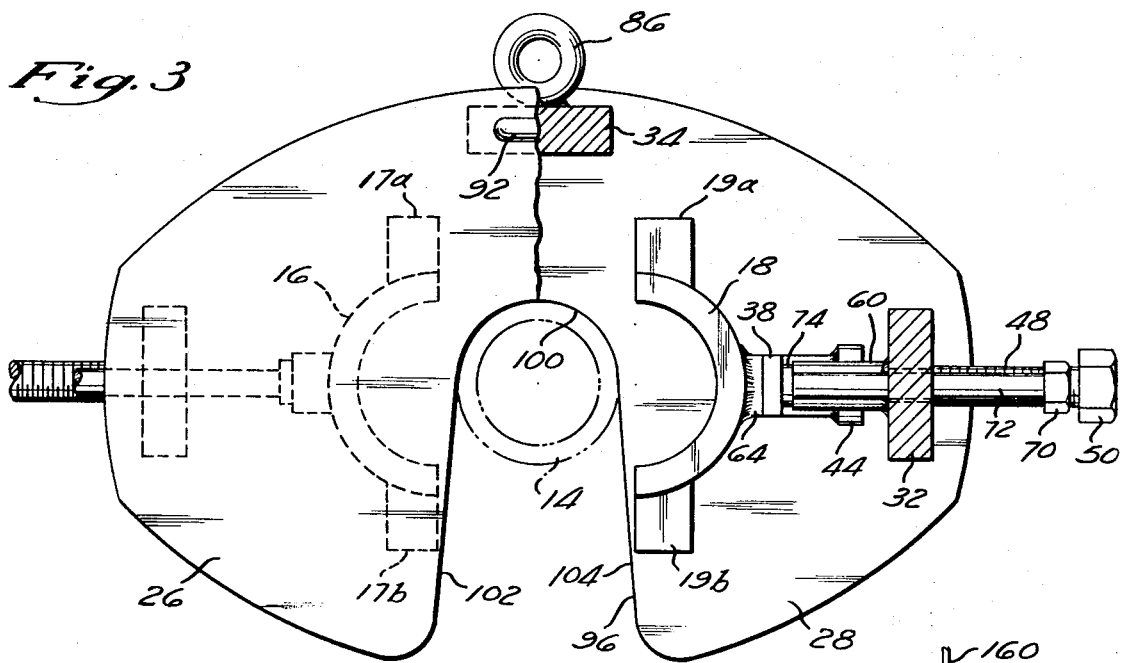
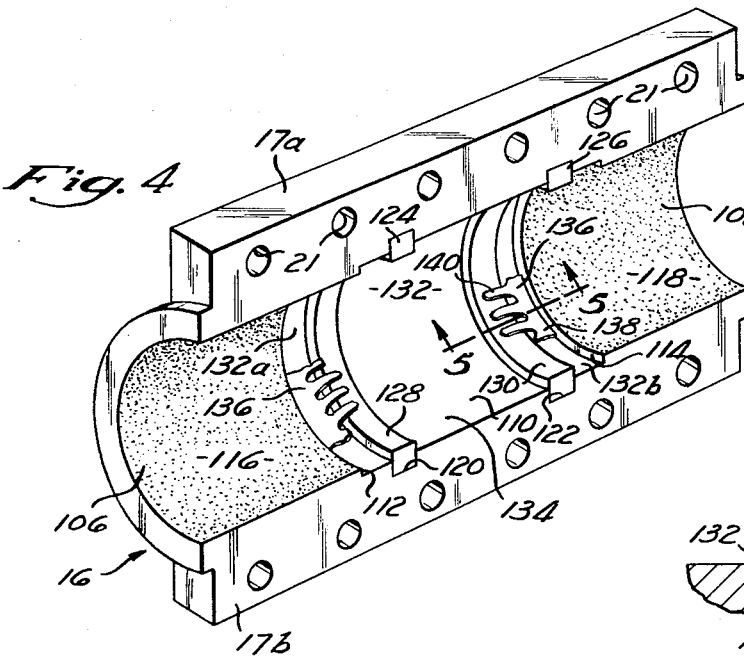
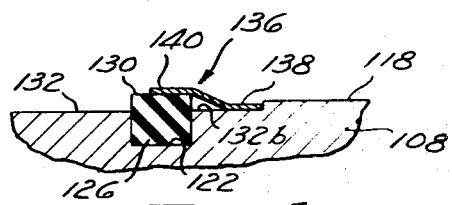
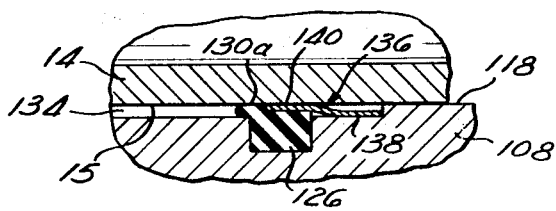
INVENTORS
JOSEPH B. SMITH,
RONALD D. GARDNER
BY
McNENNY, FARRINGTON, PEARNE & GORDON
ATTORNEYS 3,685,545

PIPE REPAIR SYSTEM

FIELD OF INVENTION

This invention relates generally to fixtures for installing devices, such as a repair coupling, on a pipe intermediate its ends and, more particularly, to a novel and improved fixture for the underwater installation of such a device. The present invention also provides a method of installing such devices or fittings.

PRIOR ART

In many instances, it is necessary to install fittings or devices on a pipe line while the line is in service. For example, such a fitting may be required to repair a break or leak in the pipe line. U.S. Pat. Nos. 3,017,204 and 3,078,108 disclose repair couplings of this general type.

In practice, such couplings are positioned around the pipe over the leak and are bolted in place. In some instances, the couplings are welded to provide a permanent installation. When these and other types of fittings or devices must be installed on an underwater pipe line, it is often difficult for the diver to position the fitting against the pipe and retain it in position while it is bolted or welded. Such positioning problems are greatly increased when the portion of the pipe line on which the fitting is to be installed is not in an easily accessible position on the floor of the body of water. Further, in some instances, repairs must be made on the pipe line where strong currents are encountered. Such currents greatly increase the diver's problems in positioning the fitting or coupling. In some instances where tidal currents are very strong, a diver can only work for short periods, often less than half an hour, when the tide changes.

The time consumed in such installation operations is, of course, important from an installation cost standpoint. In addition, in the case of a leak in the pipe, the cost of the escaping materials, as well as the effects thereof on the environment, are important factors.

SUMMARY OF THE INVENTION

In accordance with the present invention, a method and apparatus are provided for easily positioning a repair coupling or other type of device in proper position against an underwater pipe line and for holding such coupling or device in position until its installation is completed. Such method and apparatus, therefore, greatly reduce the problems a diver must overcome and, in some instances, make it possible to install such devices under conditions in which it has been virtually impossible to do so in the past.

The illustrated fixture incorporating this invention includes a frame assembly having mounting means for supporting a device such as a repair coupling in a retracted position clear of the pipe, and for moving the device relative to the frame to the installed position against the pipe after the frame is positioned on the pipe. The frame assembly also provides spaced guide means for engaging the pipe and locating the frame assembly on the pipe at the desired point of installation while the device is clear of the pipe to permit positioning of the frame. The frame assembly is retained in a stationary position by the spaced guide means as the mounting means moves the device or fitting into an installation position against the pipe. After the device or fitting is secured to the pipe, the fixture is detached and returned to the surface for reuse.

In the preferred embodiment of the present invention, the spaced guide means include a pair of axially spaced, flexible guide members which are secured to the pipe so as to bound the point of installation. The flexible guide members extend upwardly to the water's surface and pass through a pair of guideways connected to the frame assembly. A barge, boat, or similarly suitable work platform is provided at the surface above the point of installation to facilitate the work. Thus, the fitting is initially positioned within the fixture in a non-water environment as opposed to a water environment, and then is lowered to the point of installation with a flexible translation member secured to the fixture. Consequently, the heavy fitting does not have to be manually moved into an installation position adjacent the pipe as had been done in the past.

The illustrated fixture of the present invention is arranged to accommodate a two-piece fitting and to properly position them with respect to each other around the pipe. Therefore, alignment problems are eliminated by the fixture and the diver merely moves the coupling halves together so that they can be fastened to each other to form a single unit. Thus, the installation time is minimized when the fixture and method of the present invention are employed.

In accordance with another aspect of this invention, a novel and improved repair coupling is provided wherein a single coupling assembly provides central means to seal with the pipe and space gripping means to grip the pipe on both sides of the seal means. With this coupling, only two parts must be installed even when a bridging support is required across the break or leak.

BRIEF DESCRIPTION OF THE DRAWINGS

FIG. 1 is a perspective view of a fixture in accordance with the present invention being used to install a fitting on a pipe;

FIG. 2 is a plan view on an enlarged scale, with elements partially in section and with parts omitted for clarity;

FIG. 3 is an end view, partially in section, taken along the line 3—3 in FIG. 2;

FIG. 4 is a perspective view of one of the two members forming a fitting in accordance with the present invention;

FIG. 5 is an enlarged, fragmentary section taken along the line 5—5 of FIG. 4, illustrating the gasket and girdering structure before installation of the fitting;

FIG. 6 is a fragmentary, sectional view, similar to FIG. 5, illustrating the gasket and girdering structure sealed against a portion of a pipe; and FIG. 7 is a diagrammatic end view of another embodiment of the present invention having hydraulic means for moving the fitting to an installation position.

DETAILED DESCRIPTION OF THE DRAWings

FIG. 1 illustrates a fixture 10 being used to install a split coupling 12 on a pipe 14 which is located under water. The split coupling 12, having separable coupling halves 16 and 18, is being used to repair a rupture 20 in the pipe 14. The coupling halves 16 and 18 cooperate when installed to provide a single cylindrical unit encircling the rupture to prevent the escape of the material flowing in the pipe. In order to join the halves together, the coupling half 16 is provided with radially extending flanges 17a and 17b (FIG. 3) and the coupling half 18 is provided with mating flanges 19a and 19b. The flanges are provided with aligned bores 21 for connection with suitable fasteners (not shown).

In many instances, underwater pipes have a tendency to float to the surface and must be provided with additional weight to prevent them from floating. Thus, such pipes are often encased in a heavy insulation layer which also serves to protect the pipe from the damaging effects of fresh or salt water. The pipe 14 is enclosed in an insulation layer 22 which is formed of reinforced concrete. In such installations, the insulation 22 must be initially cleaned from the pipe in order to accurately locate the rupture and effect repairs. As shown in FIG. 1, the insulation 22 has been removed from the exterior surface 15 of the pipe 14 in the area of the rupture 20.

As best illustrated in FIGS. 2 and 3, the fixture 10 includes a frame assembly 24 having a longitudinal axis A—A. The frame assembly 24 has axially spaced end walls 26 and 28 which are connected to each other by a pair of axially extending side members 30 and 32 located adjacent the opposed lateral extremities of the frame assembly. The axial end walls 26 and 28 are also connected to each other adjacent the upper extremities of the frame assembly by a centrally located top member 34. Thus, the frame assembly 24 has a rectangular box-like configuration with an open bottom to permit it to be moved onto the pipe 14. The frame assembly is secured together by welds, generally indicated by the numeral 36.

The coupling halves 16 and 18 are movably mounted in the frame assembly 24 in an opposed relationship for movement relative to the frame between a retracted and extended position. When the coupling halves are moved towards each other, after the frame is positioned on the pipe, to the extended position, they form a single unit about the pipe 14. Since each of the coupling halves 16 and 18 is mounted in the frame assembly in an identical manner, only the coupling half 18 will be described in detail, it being understood that the same details of construction exist with respect to the coupling half 16.

The coupling half 18 is connected to a mounting bar 38 which is movably secured to the frame. The mounting bar extends axially along the length of the coupling half. The mounting bar 38 includes a planar face 40 on the side thereof adjacent the axis A—A which is adapted to connect with the coupling half 18, as set forth below. The other side of the mounting bar 38 has a connector bar 42 welded to it.

The connector bar 42 has a truncated, wedge-shaped configuration, the base thereof being welded to the mounting bar 38. A collar 44 is welded to the truncated end of the connector bar 42.

The coupling half 18 is moved from the retracted position to an installation position by means of a jack 46. The jack 46 is comprised of a threaded shank portion 48 connected to a head 50 which has a hex nut configuration suitable for rotation with a wrench. In some instances, the jack 46 may be provided with a gate wheel and is gate wheel-driven for adjustment to eliminate the use of a wrench. The shank portion 48 is threaded in an internally threaded bore 52 which extends through the side member 32. In this manner, relative movement of the jack with respect to the frame is provided when the head portion of the jack is rotated.

The inner end of the shank 48 extends through a clearance bore 54 in the collar 44 and has a radially extending skirt 56 fixed thereto. When the head portion 50 of the jack is rotated in an advancing direction, the skirt 56 works against the truncated end of the connector bar 42 to move the coupling half to an installation position. Similarly, when the head portion is rotated in an opposite direction, the skirt works against the collar 44 to move the coupling half to a retracted position. The coupling half is illustrated in a retracted position.

The coupling half 18 is radially and axially aligned by spaced guide pins 58, which are welded to the mounting bar 38. The guide pins extend through alignment sleeves 60, which are welded to the side member 32 of the frame. The side member 32 also provides clearance bores 62, which are axially aligned with the sleeves 60, to permit the guide pins to extend therethrough. After the coupling half has been mounted in the frame, it is always maintained in proper alignment, since the alignment sleeves are welded to the frame.

As previously indicated, the coupling half 18 is mounted in the frame by connecting it to the mounting bar 38. To that end, the coupling half has a receiving bar 64 welded to its exterior surface. The receiving bar extends axially along the length of the coupling half and provides a planar face 66 adapted to mate with the planar face 40 of the receiving bar.

The mounting bar 38 and the receiving bar 64 are securely held together by elongated bolts 68, which are axially spaced to provide stability. Each of the bolts has a head 70 adjacent the outer end thereof and an elongated shank 72. A collar 74 is fixed to the shank adjacent its opposite end and the portion of the shank which extends radially inward beyond the collar is threaded to form a threaded portion 76.

The shank 72 extends through a clearance bore 78 in the side member 32 so that the head 70 is radially outboard of the side member and the collar 72 is radially inboard. Since the collar and the head have larger dimensions than the bore 78, the bolt is captively retained by the frame.

The threaded portion 76 of the bolt 68 extends through a clearance bore 80 in the mounting bar 32 and is tightened into internally threaded bore 82 provided by the receiving bar 64. The collar 74 has dimensions larger than those of the bore 82 so as to engage the mounting bar 38 and draw it against the receiving bar 64 as the bolt is tightened.

As shown in FIG. 1, the fixture 10 is lowered to the pipe 14 by a flexible translation cable 84, which extends upwardly to the surface of the water. As illustrated, the cable is spliced adjacent the frame assembly 24 to provide support at two axially spaced locations by spliced cables 84a and 84b. The spliced cables are secured to spaced rings 86 and 87 which are welded to the top member 34 of the frame.

In order to assure the correct positioning of the fixture 10 on the pipe, a pair of axially spaced, flexible guide cables 88 and 90 are initially secured to the pipe on opposite sides of the rupture 20 by the diver. The cables 88 and 90 are secured around the pipe in any suitable manner. Preferably, quick release snaps are used to permit the diver to quickly and easily secure the cables to the pipe.

The guide cables 88 and 90 pass through a second pair of guide rings 92 and 94, respectively, and extend to the surface of the water. The guide rings 92 and 94 are welded to the axial end walls 26 and 28, respectively, of the frame assembly. Therefore, as the frame assembly is lowered with the translation cable 84, it is guided to a predetermined position on the pipe.

The axial end walls 26 and 28 of the frame assembly are provided with identical elongated recesses 96 which engage the pipe 14 at axially spaced locations. The recess openings are located adjacent the lower extremities of the end walls to receive the pipe 14 as the frame assembly is lowered into position on the pipe.

As best shown in FIG. 3, the recess 96 has a semicylindrical end wall 100 having a radius substantially equal to the radius of the pipe 14. The end wall 100 extends to a pair of oppositely disposed side walls 102 and 104, which flare slightly outward adjacent the opening of the recess. The long dimension of the recess extends in a direction substantially perpendicular to the direction of movement of the coupling halves. The short dimension of lateral width of the recess is substantially equal to the diameter of the pipe. Thus, the recesses 96 engage the pipe 14 so as to prevent movement of the frame assembly in a lateral direction, as shown in FIG. 3.

The recesses 96 and the frame assembly 24 are arranged so that the pipe 14 lies between the retracted coupling halves 16 and 18 when the frame is positioned on the pipe. When the coupling halves 16 and 18 are moved towards each other to an installation position, they form a single unit which is coaxially positioned about the pipe. As indicated above, the frame assembly 24 is restrained from reaction movement by the recesses as the coupling halves are moved together.

The underwater installation of the fitting 12 is greatly facilitated by the fixture 10, in comparison to prior art techniques, which entailed manual placement of the fitting about the pipe by the diver or divers. The installation operation is performed more quickly, requiring a minimum amount of work to be performed below the surface of the water, when the fixture and method of the present invention are employed.

According to the method of the present invention, the coupling halves 16 and 18 which form the fitting 12 are mounted in the frame assembly 24 before it is lowered into the water. Therefore, this may be done at the shop or at the work site, since bench fixtures are not required to properly mount the coupling halves. The halves are mounted in a retracted position and are spaced by a distance greater than the diameter of the pipe to provide clearance for the pipe 14 when the frame assembly is lowered to engage the pipe.

The diver initially secures the flexible guide cables 88 and 90 to the pipe 14 adjacent opposite sides of the rupture 20. The cables 88 and 90 extend to the water's surface, and are threaded through the guide rings 92 and 94. If the pipe lies on the bottom of the water, the cables can in some instances be tensioned to raise the pipe away from the bed and provide access to the entire circumference of the pipe.

The flexible translation cable 84 is connected to the frame assembly and it is lowered to the pipe. As the frame assembly is being lowered, it is guided by the cables 88 and 90 to the point of installation. The elongated recesses 96, which are aligned with the guide rings 92 and 94, engage the pipe at axially spaced locations. When the frame assembly is supported on the pipe by the recesses 96, the axis of the pipe and the longitudinal axis of the frame assembly coincide. In addition, the coupling halves are mounted in the frame assembly in an opposed relationship so as to permit them to be joined into a single unit encircling the pipe by moving them in opposite directions, towards each other, along a line passing through the axis of the pipe.

The frame assembly is also stabilized on the pipe by maintaining the cables 88 and 90 under tension so that they extend upwardly in a substantially vertical direction. The cables cooperate with the guide rings 92 and 94, which are located on the frame assembly above its center of gravity, to resist any rotational movement of the frame assembly about the pipe.

Therefore, the diver need only close the jacks 46 to move the coupling halves together into an installation position. As the coupling halves are moved together, the recesses 96 prevent lateral reaction movement of the frame assembly in a collinear direction. The guide pins 58 and alignment sleeves 60 provide radial and axial alignment of the halves to ensure proper mating and installation.

After the coupling halves are moved to an installation position, the diver secures the halves together by inserting suitable fasteners (not shown) through the bores 21. The fasteners draw the upper mating flanges 17a and 19a and the lower mating flanges 17b and 19b securely together.

After the fitting has been connected to the pipe, the diver detaches the frame assembly from each of the coupling halves. This is simply and quickly done by backing out the bolts 68. After the frame assembly is detached, it is pulled to the surface by means of the flexible cable 84 so that it can be used again. The diver then disconnects the guide cables 88 and 90 so that they can be pulled to the surface and used again.

Referring to FIG. 4, the interior of the coupling half 16, which is substantially identical to the half 18, is illustrated. The coupling half 16 has an essentially semicylindrical configuration, and provides radially extending flanges 17a and 17b for engagement with the associated flanges of the coupling half 18.

The coupling half 16 includes pipe gripping portions 106 and 108 adjacent the axial ends thereof extending to an intermediate body portion 110 which is defined by a pair of shoulders 112 and 114. The shoulders extend radially outward and provide the intermediate body portion with an increased inside radius.

The pipe gripping portions 106 and 108 have an inside radius substantially equal to the outside radius of the pipe and include gripping surfaces 116 and 118, respectively. When the coupling halves are joined into a single unit about the pipe 14, the gripping surfaces mechanically engage and lock with the adjacent outside surface 15 of the pipe.

The mechanical locking is provided by a plurality of particles having a hardness substantially greater than that of the material forming the adjacent surfaces. The particles are retained on the gripping surfaces by a suitable adhesive, such as an epoxy resin, which cooperates therewith to form a layer of substantially uniform thickness. As the coupling halves are joined together about the pipe, the particles are embedded into the adjacent gripping surface and pipe surface.

Reference may be made to the U.S. Pat. No. 3,252,192 for a detailed description of the gripping action of such particles.

The coupling half 16 includes circumferentially extending gasket grooves 120 and 122 having gaskets 124 and 126 positioned therein, respectively. The gaskets are formed of a resilient, rubberlike material, such as neoprene. The gaskets 124 and 126 are dimensioned to extend radially inward, providing sealing faces 128 and 130 for sealing engagement with the outside surface of the pipe, as set forth below in detail. In addition, each of the flanges 17a and 17b is provided with a gasket (not shown) axially extending between the gaskets 124 and 126.

As shown in FIG. 4, the gasket grooves are spaced axially inward from the shoulders 112 and 114, which define the intermediate body portion 110. Consequently, the intermediate body portion is divided into sections forming an inboard interior surface section 132 and outboard surface sections 132a and 132b with respect to the gaskets.

When the coupling halves are positioned about the pipe, the gaskets coact with the outside surface 15 of the pipe and the interior surface section 132 to generally define a sealed portion 134 therebetween. The sealed portion 134 encompasses the rupture and prevents the escape of the material being conveyed in the pipe.

Since the material being conveyed in the pipe is often at high pressures, flexible girdering members 136 are located adjacent the gaskets to augment the sealing of the gaskets. The girdering members extend along substantially the entire circumferential length of their associated gaskets. As best shown in FIG. 5, the girdering member 136 is comprised of a first portion 138 which is welded to the surface 132b of the intermediate body portion and an overhanging portion 140 which is bent radially inward. The overhanging portion extends only partially across the sealing face 130 of the gasket 122 towards the sealed portion 134.

The girdering members are formed of sheet metal, and are constructed to be bendable radially outward by engagement with the outside surface 15 of the pipe 14 (FIG. 6). The overhanging portion of the girdering member has a finger-shaped configuration to facilitate the radially outward bending and transfer a minimum load to the welds securing the first portion of the girdering member.

In order to assure contiguous engagement and mechanical locking between the gripping surfaces 116 and 118 and the outside surface 15 of the pipe, when the coupling halves are joined together about the pipe, the first portion of the girdering member is located radially outward from the gripping surfaces 116 and 118. Accordingly, the first portion 138 of the girdering member 136 is welded to the surface 132b of the intermediate body portion 110 which lies radially outward from the gripping surface 118. The first portion 138 has a thickness less than the radial length of the shoulder 114 to provide adequate clearance. Of course, the sealing faces of the gasket members and the overhanging portions of the girdering members initially lie radially inward of the gripping surfaces 116 and 118, but are deflected outwardly into substantial alignment with the gripping surfaces, as illustrated in FIG. 6, as the coupling is installed. Reference may be made to U.S. Pat. No. 3,017,204, cited above, for a more detailed discussion of the features and mode of operation of this type of seal.

Referring to FIG. 7, there is diagrammatically illustrated another embodiment of the present invention. A fixture 142, including a frame assembly 144 having a pair of split coupling halves 146 and 148 movably mounted therein, is provided. The frame assembly has axially extending side members 150 and 152 for support of the coupling halves in an opposed relationship. The fixture 142 is similar to the fixture 10 described above, except that movement of the coupling halves to an installation position is provided by oppositely disposed hydraulic cylinders 154 and 156. The hydraulic cylinders are connected to the coupling halves in an identical manner.

The hydraulic cylinder 154 is mounted on the side member 152 and provides an actuator 158 extending therethrough with clearance. The actuator is connected to the coupling half 148 and operable to move the half radially inward to an installation position.

The hydraulic cylinders are supplied with a hydraulic fluid through a main feed line 160 having an actuating valve 162. The hydraulic feed line has a tee connection extending to cylinder feed lines 160a and 160b to simultaneously feed both of the cylinders. Therefore, in this embodiment, the diver merely actuates the hydraulic cylinders to move the coupling halves together to form a single unit about the pipe.

Although preferred embodiments of this invention are illustrated, it is to be understood that various modifications and rearrangements may be resorted to without departing from the scope of the invention disclosed.

What is claimed is:

1. A fixture for installing a fitting below the surface of a liquid on a pipe intermediate its ends, wherein said fitting includes two separable members adapted to encircle a pipe comprising a frame assembly including spaced guide means adapted to engage a pipe at spaced locations and locate said frame in a predetermined position with respect to a pipe, and oppositely disposed mounting means on said frame assembly operable to support each of said members in a retracted position in which said separable members are clear of a pipe, said mounting means being operable to move said separable members to an installation position encircling such pipe and hold said separable members in said installation position while said frame is in said predetermined position.

2. A fixture as set forth in claim 1, wherein said mounting means is operable to move said separable members together in opposite directions along a line passing through the axis of such pipe to said installation position and said spaced guide means prevents movement of said frame assembly in either of said opposite directions.

3. A fixture as set forth in claim 2, wherein said fixture includes spaced end walls, said spaced guide means includes an elongated recess in each of said end walls adapted to be positioned over a pipe, said recess having its long dimension extending in a direction substantially perpendicular to the direction of movement of said separable members and its short dimension substantially equal to the diameter of such pipe.

4. A fixture as set forth in claim 3, wherein said spaced guide means includes a flexible translation member secured to said frame assembly and a flexible guide member secured to a pipe adjacent said predetermined position where said fitting is to be installed extending upwardly to the surface of said liquid and through a guideway provided by said frame.

5. A fixture as set forth in claim 4, wherein said spaced guide means includes a second flexible guide member secured to such pipe so that said predetermined position lies intermediate said flexible guide members, said second flexible guide member extending upwardly to the surface of said liquid and through a second guideway provided by said frame assembly.

6. A fixture as set forth in claim 5, wherein said first-mentioned guideway is located adjacent one of said axial end walls of said frame assembly and said second guideway is located adjacent the other axial end wall of said frame assembly.

7. A fixture as set forth in claim 1, wherein said mounting means includes a pair of oppositely disposed jacks on said frame assembly and operatively connected to said separable members to provide movement thereof towards and away from a pipe.

8. A fixture as set forth in claim 7, wherein said jacks are screw jacks operable to position and move the associated separable members.

9. A fixture as set forth in claim 7, wherein said jacks include hydraulic means, said hydraulic means providing oppositely disposed actuators, said actuators being operatively connected to said separable members to provide movement thereof towards a pipe.

10. A fixture as set forth in claim 7, wherein said mounting means includes alignment means for radial and axial alignment of said separable members.

11. A fixture as set forth in claim 10, wherein said alignment means includes guide pins radially extending from a pair of mounting bars separately connected to each of said separable members and mating alignment sleeves fixed to said frame assembly adapted to receive said guide pins in a sliding relationship.

12. A fixture as set forth in claim 11, wherein said fitting includes a split coupling comprising a pair of semicylindrical members and means to join said members into a single cylindrical unit to encircle such pipe, each of said members including a body portion having a pipe gripping portion adjacent each end thereof to embrace such pipe and an intermediate body portion having an inside diameter greater than the outside diameter of such pipe, gasket means surrounding said intermediate body portion coacting with said members and such pipe to define a sealed portion therebetween, said gasket means including resilient, rubberlike gasket members positioned in gasket grooves in each of said members and radially extending therefrom to form said sealed portion, flexible girdering means secured to each of said members adjacent said gasket members and overhanging said gasket members, and pipe gripping means adjacent the interior surface of said pipe gripping portion, said pipe gripping means mechanically engaging the adjacent surfaces of said members and such pipe when said members are joined into a single unit.

13. A fixture as set forth in claim 12, wherein said flexible girdering means comprises a first portion secured to each of said members axially outwardly from said sealed portion and a second portion bent radially inward overhanging each of said gasket members, said second portion extending only partially across said gasket members towards said sealed portion and constructed to be bendable radially outward by engagement with the outside surface of such pipe when said members are joined into a single unit.

14. A fixture as set forth in claim 13, wherein said first portion of said flexible girdering means is secured to said intermediate body portion so as to lie radially outward from said interior surface of said pipe gripping portion and thereby provide clearance for such pipe when said members are joined into a single unit.

15. A fixture as set forth in claim 14, wherein said pipe gripping means includes a plurality of particles having a hardness substantially greater than the hardness of the adjacent surfaces of said members and such pipe, said particles retained adjacent the interior surface of said pipe gripping portion by an adhesive and forming a layer of substantially uniform thickness, and said particles being embedded in the adjacent surfaces when said members are joined into a single unit.

16. A method of installing a fitting below the surface of a liquid on a pipe intermediate its ends wherein said fitting includes two separable members adapted to be joined into a single unit encircling such pipe comprising mounting said separable members in a frame assembly having mounting means operable to support said separable members in a retracted position clear of such pipe and operable to move said separable members together to an installation position against such pipe, securing to such pipe a flexible guide member which extends upwardly to the surface of said liquid and through a guideway provided by said frame assembly, securing a flexible translation member to said frame assembly, lowering said frame assembly to a predetermined position on such pipe, engaging spaced guide means provided by said frame assembly at spaced locations on such pipe, moving said separable members from said retracted position to an installation position encircling such pipe while said spaced guide means retain said frame assembly in said predetermined position and joining said separable members into a single unit.

17. A method as set forth in claim 16, wherein said mounting means moves said separable members together in opposite directions along a line passing through the axis of such pipe to said installation position and said spaced guide means prevents movement of said frame assembly in said opposite directions.

18. A method as set forth in claim 17, wherein said flexible guide member is maintained under sufficient tension after said frame assembly has been positioned on such pipe to provide cooperation between said flexible member and said guideway to resist rotational movement of said frame assembly about such pipe.

19. A method as set forth in claim 16, wherein said frame assembly and said flexible guide member are disconnected from said separable members and such pipe, respectively, after said separable members have been joined into a single unit.

* * * * *